(12) United States Patent
Takahashi et al.

(10) Patent No.: US 11,521,246 B2
(45) Date of Patent: Dec. 6, 2022

(54) MOBILE MAPPING SYSTEM-RELATED INFORMATION PROCESSING DEVICE, FEE CALCULATION SYSTEM, AND PROGRAM STOP DEVICE

(71) Applicant: Mitsubishi Electric Corporation, Tokyo (JP)

(72) Inventors: Yukako Takahashi, Tokyo (JP); Takuma Kadoya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/268,960

(22) PCT Filed: Oct. 10, 2019

(86) PCT No.: PCT/JP2019/040082
§ 371 (c)(1),
(2) Date: Feb. 17, 2021

(87) PCT Pub. No.: WO2020/075821
PCT Pub. Date: Apr. 16, 2020

(65) Prior Publication Data
US 2021/0256578 A1 Aug. 19, 2021

(30) Foreign Application Priority Data
Oct. 12, 2018 (JP) .............................. JP2018-193660

(51) Int. Cl.
*G06Q 30/02* (2012.01)
*G01C 21/00* (2006.01)

(52) U.S. Cl.
CPC ..... *G06Q 30/0284* (2013.01); *G01C 21/3841* (2020.08)

(58) Field of Classification Search
CPC ........................ G06Q 30/0284; G01C 21/3841
(Continued)

(56) References Cited

U.S. PATENT DOCUMENTS

2012/0128207 A1 5/2012 Manabe et al.
2013/0159193 A1* 6/2013 Tang .................. G06Q 20/1235
705/51
2019/0265045 A1* 8/2019 Baik .................... G05D 1/0274

FOREIGN PATENT DOCUMENTS

EP 3719781 A1 10/2020
JP 2000357191 A * 12/2000
(Continued)

OTHER PUBLICATIONS

"Map Usage in Virtual Environments: Orientation Issues" Published by IEEE (Year: 2022).*
(Continued)

*Primary Examiner* — Zeina Elchanti
(74) *Attorney, Agent, or Firm* — Xsensus LLP

(57) ABSTRACT

An information processing device (100) includes a map information generation unit (11) and a usage amount calculation unit (12). The map information generation unit (11) generates map information by using measurement information including a plurality of types of information measured by a measurement device (300) which measures information on features and is mounted on a measurement vehicle (310). The usage amount calculation unit (12) calculates a usage amount of the map information generation unit (11) used for generating the map information by using at least one of the plurality of types of information included in measurement information.

14 Claims, 9 Drawing Sheets

(58) Field of Classification Search
USPC .......................................................... 705/417
See application file for complete search history.

(56) References Cited

FOREIGN PATENT DOCUMENTS

| | | |
|---|---|---|
| JP | 2002-318533 A | 10/2002 |
| JP | 2004-101780 A | 4/2004 |
| JP | 2009-122291 A | 6/2009 |
| JP | 2010-277187 A | 12/2010 |
| JP | 2012-37490 A | 2/2012 |
| JP | 2012-155660 A | 8/2012 |
| JP | 2017-90121 A | 5/2017 |
| KR | 10-2017-0087156 A | 7/2017 |
| WO | 2018/017793 A1 | 1/2018 |
| WO | 2019/103150 A1 | 5/2019 |

OTHER PUBLICATIONS

International Search Report and Written Opinion dated Dec. 24, 2019, received for PCT Application PCT/JP2019/040082, Filed on Oct. 10, 2019, 10 pages including English Translation.
Extended European Search Report dated Oct. 13, 2021, in corresponding European Patent Application No. 19871657.3.
Office Action dated Jan. 18, 2022, in corresponding Japanese patent Application No. 2020-551233, 7 pages.

\* cited by examiner

Fig.7

31S:PREPAID DATA INFORMATION

| USER ID | PREPAID DATA |
|---------|--------------|
| 001 | 300,000 |
| 002 | 500,000 |
| ⋮ | ⋮ |

32S  33S

MOBILE MAPPING SYSTEM-RELATED INFORMATION PROCESSING DEVICE, FEE CALCULATION SYSTEM, AND PROGRAM STOP DEVICE

CROSS-REFERENCE TO RELATED APPLICATIONS

The present application is based on PCT filing PCT/JP2019/040082, filed Oct. 10, 2019, which claims priority to JP 2018-193660, filed Oct. 12, 2018, the entire contents of each are incorporated herein by reference.

TECHNICAL FIELD

The present invention relates to an information processing device that generates a map by using measurement information acquired by measuring positions and dimensions of a road and features around the road, and a program stop device that stops usage of a map information generation program.

BACKGROUND ART

In recent years, development of autonomous traveling vehicles has been carried out. In order to realize the autonomous traveling, a highly accurate 3-D map is required in addition to information acquired from sensors such as cameras and laser radars attached to autonomous traveling vehicles. As a method for generating the highly accurate 3-D map, there is MMS (Mobile Mapping System).

In MMS, by running a surveying vehicle, the surveying vehicle acquires information on a road surface and equipment on sides of the road, and map information is generated based on this information.

Conventionally, in order to interpret features based on point cloud information acquired by a laser radar, a person has manually extracted and plotted the features by using a 3-D CAD editing tool to perform a plotting process.

However, when a wide range of map information is manually prepared by a person, the amount of information of the point cloud to be processed becomes enormous, which imposes a heavy burden on an operator, and a work cost becomes enormous.

In particular, in a highly accurate 3-D map, the workload of extracting position information of section lines and shoulder edges, which are the minimum required for realizing the autonomous traveling, is large, and a cost required for an extraction work is also large.

Therefore, there is a demand for software that automatically extracts and plots features from measurement information acquired from a measurement device used in MIMS.

For example, a map generation system of Patent Literature 1 provides a function of detecting a step from point cloud information by dividing a 3-D space of measurement information into a mesh, creating various candidate lines in the mesh, and evaluating spaces.

CITATION LIST

Patent Literature

Patent Literature 1: JP2012-37490A

SUMMARY OF INVENTION

Technical Problem

When providing software that automatically extracts and plots features from measurement information acquired from the measurement device used in MMS, the usage amount of software varies according to a map preparation plan.

Therefore, it is desirable to charge a usage fee according to a usage amount of the software, instead of charging a flat rate for the usage amount of the software.

However, no method for accurately detecting the usage amount of software that automatically extracts and plots features from measurement information acquired from the measurement device used in MMS, is provided.

The present invention aims to provide an information processing device that can charge a fee, according to a usage amount of a user, for the usage amount, the information processing device automatically extracting and plotting features from measurement information acquired from a measurement device used in MMS.

Solution to Problem

Advantageous Effects of Invention

According to an information processing device of the present invention, it is possible to provide an information processing device that calculates an appropriate usage amount according to measurement information, the information processing device automatically extracting and plotting features from the measurement information.

BRIEF DESCRIPTION OF DRAWINGS

FIG. 7 is a diagram illustrating prepayment data information 31S, which is a diagram of the second embodiment;

DESCRIPTION OF EMBODIMENTS

First Embodiment

Figure 1:
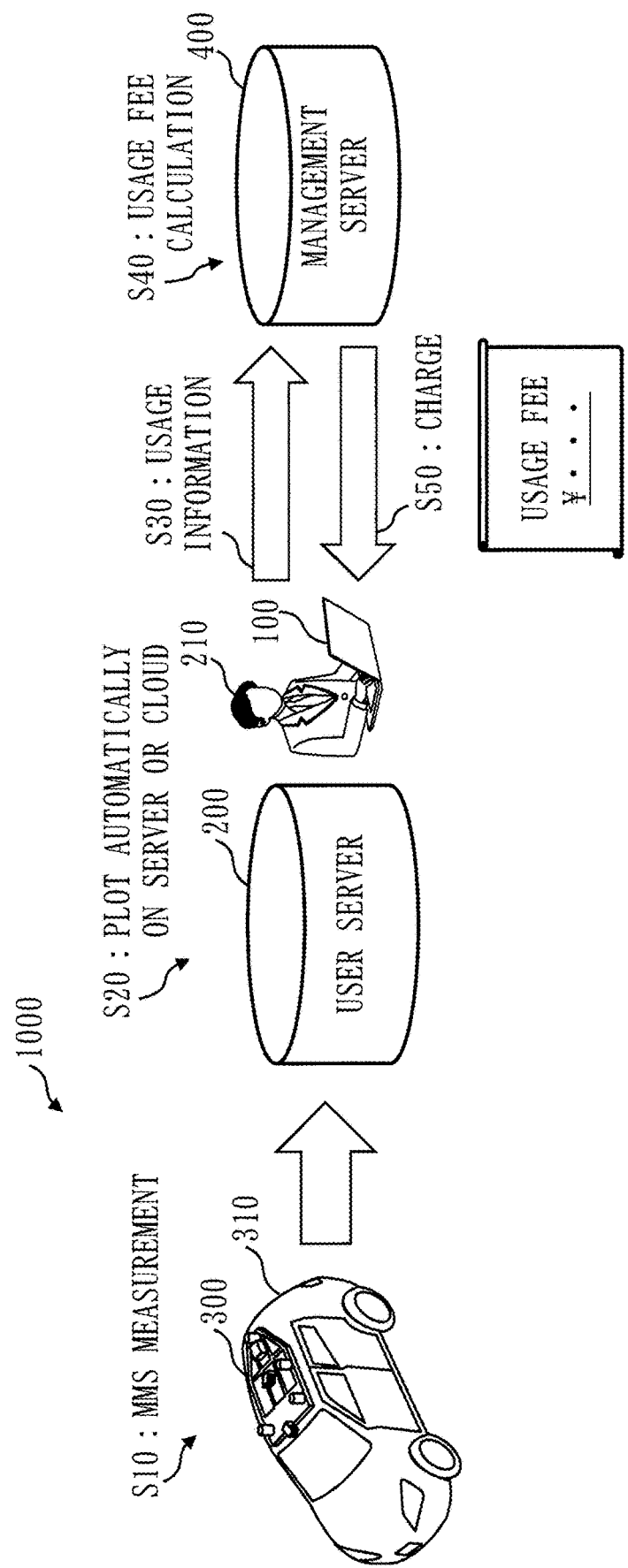
FIG. 1 is a schematic diagram illustrating a processing flow in a fee calculation system 1000, which is a diagram of a first embodiment.

A fee calculation system 1000 for calculating a usage fee of a map information generation unit 11 in a first embodiment will be described with reference to FIGS. 1 to 4. FIG. 1 is a schematic diagram illustrating a processing flow in the fee calculation system 1000.

Figure 2:
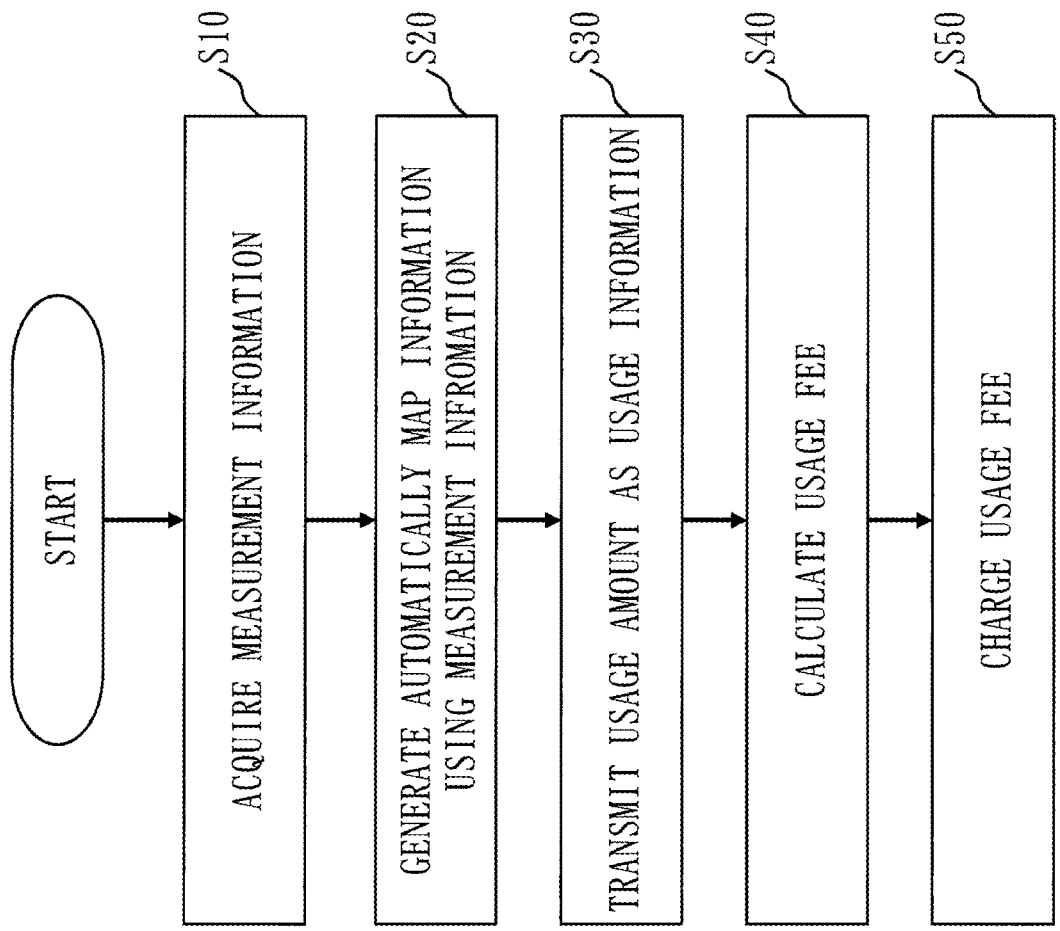
FIG. 2 is a flowchart illustrating a processing flow of the fee calculation system 1000, which is a diagram of the first embodiment.

FIG. 2 is a flowchart illustrating a processing flow of the fee calculation system 1000.

Figure 3:
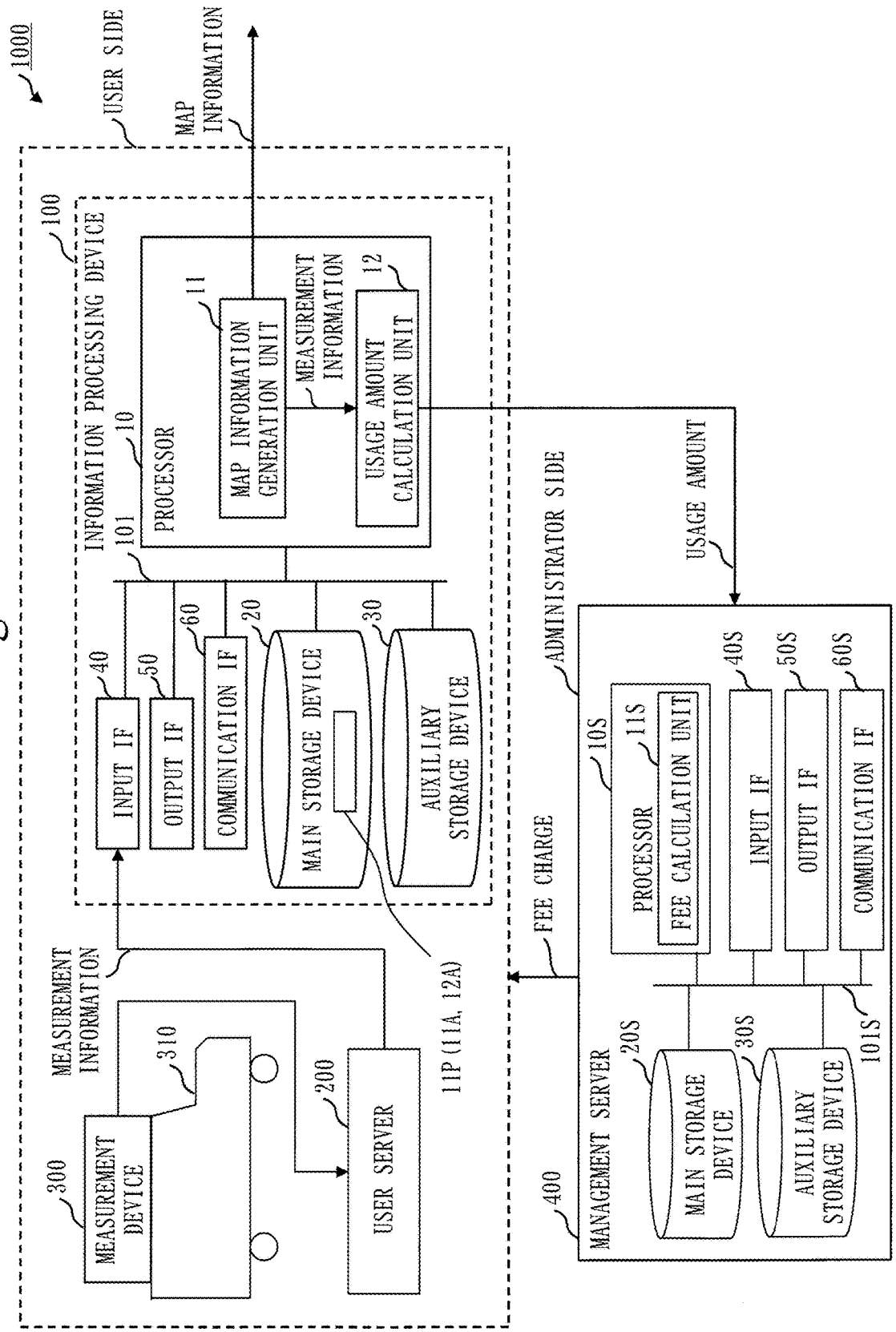
FIG. 3 is a diagram illustrating a hardware configuration of the fee calculation system 1000, which is a diagram of the first embodiment.

FIG. 3 illustrates a hardware configuration of the fee calculation system 1000.

As illustrated in FIG. 3, the fee calculation system 1000 includes the map information generation unit 11 provided in an information processing device 100, a usage amount calculation unit 12 provided in the information processing device 100, and a fee calculation unit 11S provided in a management server 400.

The map information generation unit 11 automatically extracts and plots features from the measurement information measured by the measurement device that measures information on the features.

Specifically, a measurement device 300 is mounted on a measurement vehicle 310 to measure the information on the features. And, the map information generation unit 11 uses the measurement information including a plurality of types of information measured by the measurement device 300 to generate the map information.

The usage amount calculation unit 12 calculates the usage amount of the map information generation unit 11 used for generating the map information by using at least one of the plurality of types of information included in the measurement information. The fee calculation unit 11S calculates the usage fee of the map information generation unit 11 based on the usage amount calculated by the usage amount calculation unit 12.

In step S10, the measurement information is acquired by traveling of the measurement vehicle 310 on which the measurement device 300 is mounted. The measurement information is stored in a user server 200.

In step S20, the information processing device 100 uses the measurement information to generate the map information. The information processing device 100 may be a computer owned by a user 210 that generates the map information, or may be a server existing in cloud.

In step S30, the management server 400 acquires a usage amount from the user 210.

The usage amount is usage information indicating a usage amount of map generation software.

Specifically, the usage amount means a usage amount, by the user 210, of the map information generation unit 11 described later.

In step S40, the management server 400 calculates the usage fee based on the usage amount.

In step S50, the management server 400 charges the user 210 for the usage fee.

* Description of Configuration *

As illustrated in FIG. 3, in the fee calculation system 1000, the measurement vehicle 310, on which the measurement device 300 is mounted, the information processing device 100, and the user server 200 are arranged on a user side. In the fee calculation system 1000, the management server 400 is arranged on an administrator side. The information processing device 100 generates the map information based on the measurement information measured by the measurement device 300.

The measurement device 300 is a device used in MMS which includes sensors such as a camera and a laser scanner. The measurement vehicle 310 is a vehicle on which the measurement device 300 is mounted. As the measurement vehicle 310 travels on a vehicle road, the measurement device 300 acquires information on features existing around the vehicle road as the measurement information. Besides, the measurement device 300 may be not only a dedicated vehicle for the measurement but also a general vehicle on which the measurement device 300 is mounted.

The information processing device 100 in FIG. 3 is a computer. The information processing device 100 includes a processor 10 and other pieces of hardware such as a main storage device 20, an auxiliary storage device 30, an input interface 40, an output interface 50, and a communication interface 60. The processor 10 is connected to other pieces of hardware via signal lines 101 and controls these other pieces of hardware.

The information processing device 100 includes the map information generation unit 11 and the usage amount calculation unit 12 as components. The map information generation unit 11 and the usage amount calculation unit 12 are realized by an information processing program 11P which is software.

The information processing program 11P includes a map information generation program 11A, which realizes the map information generation unit 11, and a usage amount calculation program 12A, which realizes the usage amount calculation unit 12. The information processing program 11P is stored in the main storage device 20 as described later. Further, the information processing program 11P may be stored in the auxiliary storage device 30.

The processor 10 is a device that executes the information processing program 11P. The information processing program 11P is a program that realizes functions of the map information generation unit 11 and the usage amount calculation unit 12. The processor 10 is an IC (Integrated Circuit) that performs an arithmetic process. Specific examples of the processor 10 are a CPU (Central Processing Unit), a DSP (Digital Signal Processor), and a GPU (Graphics Processing Unit).

The main storage device 20 is a storage device that temporarily stores data. Specific examples of the main storage device 20 are an SRAM (Static Random Access Memory) and a DRAM (Dynamic Random Access Memory). The main storage device 20 holds the calculation result of the processor 10.

The auxiliary storage device 30 is a storage device that stores data in a non-volatile manner. A specific example of the auxiliary storage device 30 is an HDD (Hard Disk Drive). Further, the auxiliary storage device 30 may be a portable recording medium such as an SD (registered trademark) (Secure Digital) memory card, CF (CompactFlash), NAND flash, a flexible disk, an optical disk, a compact disk, a Blu-ray (registered trademark) disk, a DVD (Digital Versatile Disk), or the like.

The input interface 40 is a port to which various apparatuses are connected and data of various apparatuses are input. The output interface 50 is a port to which various apparatuses are connected and via which data is output to the various apparatuses by the processor 10. The communication interface 60 is a communication port for the processor 10 to communicate with other devices.

The information processing program 11P is stored in the main storage device 20. The information processing program 11P is read from the main storage device 20 into the processor 10 and executed by the processor 10. The main storage device 20 stores not only the information processing program 11P but also the OS (Operating System). The processor 10 executes the information processing program 11P while executing the OS.

The information processing program 11P and the OS may be stored in the auxiliary storage device 30. The information processing program 11P and the OS stored in the auxiliary storage device 30 are loaded into the main storage device 20 and executed by the processor 10. Further, a part or all of the information processing program 11P may be incorporated into the OS.

Besides, it is acceptable that the software that configures the map information generation unit 11 and the usage amount calculation unit 12 is not installed in the information processing device 100 itself and the software that configures the map information generation unit 11 and the usage amount calculation unit 12 is installed on a server on the Web.

At this time, a configuration may be that the user 210 accesses the server on the Web and executes the map generation process.

The information processing device 100 may include a plurality of processors that replace the processor 10. For example, the information processing device 100 may separately include an image processing processor. The plurality of these processors share an execution of the information processing program 11P. Each processor is a device that executes the information processing program 11P in the same manner as the processor 10.

Data, information, signal values, and variable values used, processed, or output by the information processing program 11P are stored in the main storage device 20, the auxiliary storage device 30, or a register or cache memory in the processor 10.

The information processing program 11P is a program which causes a computer to execute each process, each procedure, or each step obtained by reading "unit" of each unit of the map information generation unit 11 and the usage amount calculation unit 12 as "process", "procedure", or "step".

Further, an information processing method is a method performed by the information processing device 100, which is a computer, executing the information processing program 11P. The information processing program 11P may be provided by being stored in a computer-readable recording medium, or may be provided as a program product.

The management server 400 illustrated in FIG. 3 is also a computer as with the information processing device 100. The management server 400 includes a processor 10S and other pieces of hardware such as a main storage device 20S, an auxiliary storage device 30S, an input interface 40S, an output interface 50S, and a communication interface 60S. In the hardware of the management server 400, the components corresponding to the information processing device 100 use same numbers as the information processing device 100.

The processor 10S executes a fee calculation program which realizes the function of the fee calculation unit 11S. The function of the fee calculation unit 11S is realized by the fee calculation program. The fee calculation program is stored in the auxiliary storage device 30S. The processor 10S loads the fee calculation program from the auxiliary storage device 30S into the main storage device 20S, and reads the fee calculation program from the main storage device 20S to execute.

* Description of Operation *

An operation of the fee calculation system 1000 will be described below. The operation procedure of the information processing device 100 in the fee calculation system 1000 corresponds to an information processing method. A program that realizes the operation of the information processing device 100 corresponds to the information processing program 11P. In the information processing method, an information processing device 100, which is a computer, generates the map information by the map information generation process that generates the map information using measurement information including a plurality of types of information, which is measured by the measurement device that measures information on features and is mounted on a vehicle. Then, the information processing device 100, which is a computer, calculates the usage amount of the map information generation process using at least one of the plurality of types of information.

The map information generation unit 11 generates the map information based on the measurement information measured by the measurement device 300.

Further, the map information generation unit 11 transmits to the usage amount calculation unit 12, information of the measurement information actually used for generating the map information among pieces of measurement information acquired from the measurement device 300.

However, when the usage amount calculation unit 12 directly acquires the measurement information, the map information generation unit 11 may transmit only section information that specifies a section in which the map information has been generated.

The usage amount calculation unit 12 calculates and output the user usage amount of the map information generation unit 11 which generates the map information, based on the information of the measurement information, which is acquired from the map information generation unit 11 and used for generating the map information.

Besides, when the map information generation unit 11 and the measurement device 300 are shared by one vendor in common, the usage amount by the user is not only the usage amount of the map information generation unit 11 but also the usage amount including the usage amount of the measurement device 300.

The management server 400 is provided on a vendor side, which is an administrator who provides software that configures the map information generation unit 11 and the usage amount calculation unit 12.

The management server 400 acquires the usage amount output by the usage amount calculation unit 12 from the information processing device 100.

The fee calculation unit 11S of the management server 400 calculates a fee according to the usage amount for each user based on the usage amount acquired from the information processing device 100, and charges the user 210 for the usage fee.

Figure 4:
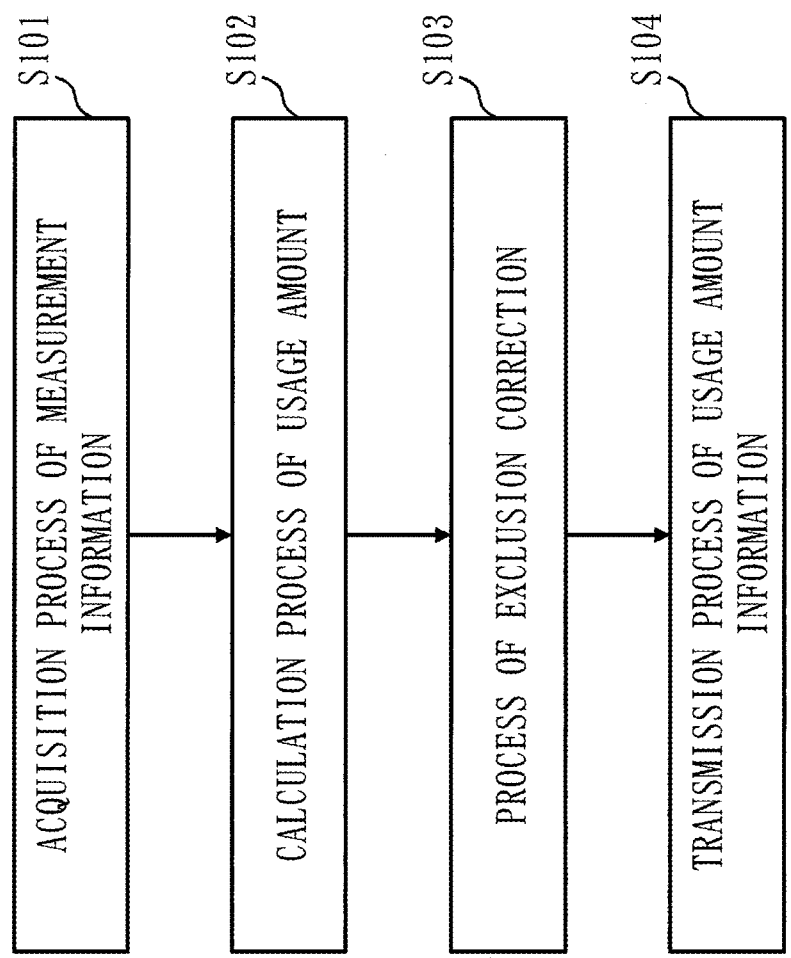
FIG. 4 is a flowchart illustrating a calculation process, by a usage amount calculation unit 12, of a usage amount of a map information generation unit 11 by a user, which is a diagram of the first embodiment.

FIG. 4 is a flowchart illustrating a calculation process, by the usage amount calculation unit 12, of the usage amount of the map information generation unit 11 by the user.

In FIG. 4, the usage amount calculation unit 12 executes each step from step S101 to step S104, and transmits the usage amount information of the user to the management server 400.

Step S101 is a process of acquiring the measurement information.

Step S102 is a process of calculating the usage amount.

Step S103 is a process of exclusion correction.

Step S104 is a process of transmitting the usage amount.

<Process of Acquiring Measurement Information>

In step S101, the usage amount calculation unit 12 acquires from the map information generation unit 11, the measurement information used by the map information generation unit 11 for generating the map information. The measurement information includes a plurality of types of information.

Specifically, the measurement information includes four types of following information from 1. Time information to 4. Position information of the measurement vehicle 310. The measurement information includes four types of information:
1. Time information;
2. Luminance information of 3D point cloud acquired by a laser radar;
3. Coordinate information for each detected point cloud; and
4. Position information of a measurement vehicle 310.

Information from 1. Time information to 4. Position information are associated with each other.

However, when the usage amount calculation unit 12 directly acquires the measurement information from the user server 200, the following configuration may be used. The usage amount calculation unit 12 receives only the section information that specifies the section in which the map information has been generated, from the map information generation unit 11, and specifies from the received section information, the measurement information used for generating the map information among pieces of measurement information. This section information is also included in the measurement information.

<Process of Calculating Usage Amount>

In step S102, the usage amount calculation unit 12 calculates the usage amount of the map information generation unit 11 by the user 210 based on the measurement information actually used for generating the map information acquired in step S101.

Specifically, as the usage amount of the map information generation unit 11 by the user 210, the usage amount calculation unit 12 calculates at least one of followings, which are 1. Distance information, 2. Measurement time information, and 3. Data amount information:
1. Distance information indicating a distance of a section in which map information has been generated;
2. Measurement time information indicating measurement time taken for measurement of a section in which map information has been generated; and
3. Data amount information indicating a data amount of 3-D point cloud data in a section in which map information has been generated.

Any of 1. Distance information, 2. Measurement time information, and 3. Data amount information increases in proportion to the generated map information.

Therefore, by using any one of these pieces of information or a combination of these pieces of information for the fee calculation, it is possible to realize an accurate fee calculation according to the usage amount of the user.

<In a Case of Calculating Distance Information as Usage Amount>

The usage amount calculation unit 12 calculates the distance information indicating the measurement distance of "measurement information used for generating map information" as the usage amount by using at least one type of information among the plurality of types of information included in the "measurement information used for generating map information". Specifically, the usage amount calculation unit 12 calculates the distance information using the time information and the position information of the measurement vehicle 310 among the plurality of types of information as follows. When calculating the distance information of the section in which the map information has been generated, as the usage amount, the usage amount calculation unit 12 can calculate the distance information of the measured section based on difference between the position information of the measurement vehicle 310 at a measurement start time of the measurement information and the position information of the measurement vehicle 310 at a measurement end time of the measurement information. The position information of the measurement vehicle 310 may be data acquired from an odometer mounted on the measurement vehicle 310 or from GPS (Global Positioning System), or navigation data if a car navigation system is mounted on the measurement vehicle 310.

<In a Case of Calculating Measurement Time Information as Usage Amount>

The usage amount calculation unit 12 calculates the measurement time information indicating the measurement time taken to measure the section in which the map information has been generated, as the usage amount by using at least one type of information among the plurality of types of information included in "measurement information used for generating map information".

When the measurement time information is used, the usage amount calculation unit 12 can calculate the measurement time of the measurement information by taking the difference between the measurement start time and the measurement end time included in the measurement information.

<3. In a Case of Calculating Data Amount Information as Usage Amount>

The usage amount calculation unit 12 calculates the data amount information indicating the data amount of the section in which the map information has been generated, as the usage amount by using at least one type of information among the plurality of types of information included in "measurement information used for generating map information".

When the data amount information is used, the usage amount calculation unit 12 can calculate the data amount by counting the number of pieces of data of the coordinates of the 3-D point cloud in the measurement information.

<Exclusion Correction Process>

In step S103, the usage amount calculation unit 12 determines whether or not there exists an exclusion item set as an item to be excluded from the usage amount calculation, and if the exclusion item exists, excludes the exclusion item from the usage amount, and calculates a final usage amount. The exclusion items are generation failure of the map information and section overlapping in the following example. The usage amount calculation unit 12 calculates a section that should not be used for the fee calculation, and corrects the usage amount calculated in step S102.

Specifically, as a section that should not be used for the fee calculation, the usage amount calculation unit 12 calculates a section in which the generation of map information has failed, and excludes the section from the usage amount used for the fee calculation. Alternatively, the usage amount calculation unit 12 calculates a section that overlaps with the section generated in the past, among the sections of pieces of generated map information, and excludes that section from the usage amount used for the fee calculation.

<Generation Failure of Map Information>

As the exclusion item, the usage amount calculation unit 12 determines whether or not there exists a section in which the generation has failed in a part of the generated map information. If there exists a section in which the generation has failed, the usage amount calculation unit 12 excludes a section in which the generation has failed, from the usage amount, and calculates the final usage amount.

Specifically, the generation failure of the map information is as follows. In the generation process of map information by the map information generation unit 11, if there exists the section in which the map information generation unit 11 has failed for the map generation process due to a problem of the measurement information, the map information generation unit 11 keeps the failure section as a record. The usage amount calculation unit 12 checks the record in the map information generation unit 11. If there exists the recorded failure section, the usage amount calculation unit 12 calculates the usage amount in the failure section for later subtraction.

<Overlapping of Sections>

As the exclusion item, the usage amount calculation unit 12 determines whether or not there exists in the generated map information, an area that is generated being overlapped. When there exists the area generated being overlapped, the usage amount calculation unit 12 eliminates the overlapping by excluding the overlapped area from the usage amount and calculates the final usage amount.

Specifically, the overlapping of sections is as follows. When generating the map information of a specific section, the specific section is actually divided into a number of sections to perform the measurement, and the map information is generated for each section. At that time, in the measurement by the measurement vehicle 310, an end part of each section is measured so as to overlap with preceding and following sections so that the measurement information is not insufficient. Therefore, in the measurement information of each section, there exists an area that overlaps with the preceding and following sections. Therefore, the usage amount calculation unit 12 specifies the overlapped area from the preceding and following pieces of measurement information, and calculates the usage amount in the overlapped section for the later subtraction.

The usage amount calculation unit 12 corrects the usage amount by subtracting from the usage amount calculated in step S102, the usage amount calculated in <Generation Failure of Map Information> or <Overlapping of Sections> described above. Besides, for the calculation of the usage amount in the failure section or the overlapped sections, according to the process of step S102, it is sufficient if at least one of 1. Distance information, 2. Measurement time information, and 3. Data amount information is calculated.

In step S104, the usage amount calculation unit 12 transmits to the management server 400, the usage amount corrected in step S103. Besides, the usage amount calculated in the calculation process of the usage amount in step S102 may be transmitted to the management server 400 directly without providing an exclusion correction process in step S103.

As illustrated in FIGS. 1 and 3, the management server 400 receives the usage amount from the information processing device 100. Specifically, the fee calculation unit 11S of the management server 400 receives the usage amount from the information processing device 100 via the communication interface 60S. The fee calculation unit 11S calculates the usage fee of the map information generation unit 11 by the user 210 using the received usage amount.

Effect of First Embodiment

According to the information processing device 100 of the first embodiment, the usage amount calculation unit 12 calculates the usage amount of the map information generation unit 11 by the user 210 based on the measurement information actually used by the map information generation unit 11 for generating the map information. Therefore, it is possible to calculate an appropriate usage amount according to the measurement information.

Further, since the fee calculation unit 11S of the management server 400 calculates the usage fee using the usage amount received from the information processing device 100, it is possible to realize the fee calculation according to the usage amount of the map information generation unit 11 by the user 210. By this fee calculation, since it is possible to set the fee according to the usability using the map information generation unit 11, a discrepancy between the usability of the user 210 and the charge amount can be reduced.

Further, as the usage amount of the user, the usage amount calculation unit 12 calculates at least one of:
1. Distance information of a section in which map information has been generated;
2. Measurement time information taken for measurement of a section in which map information has been generated; and
3. Data amount information of 3D point cloud data in a section in which map information has been generated, out of entire measurement information. All of 1. Distance information, 2. Measurement time information, and 3. Data amount information are information that increases in proportion to the generated map information. Therefore, by using any one of these or a combination of these pieces of information for the fee calculation, it is possible to realize the calculation of the charge fee according to the usage amount of the user 210.

Modification Example 1

In the first embodiment, the configuration is that the user server 200 receives the measurement information from the measurement device 300. However, the measurement information may exist anywhere as long as the information processing device 100 is available to use.

For example, the configuration may also be that the measurement information is saved in a server on the cloud and when the map information is generated, the map information generation unit 11 of the information processing device 100 accesses the server to acquire the measurement information.

Further, the information processing device 100 has a configuration in which the usage amount is calculated and the usage fee is not calculated.

However, the configuration may be that the usage amount calculation unit 12 has a function of the fee calculation unit 11S, calculates the fee, and transmits the calculated fee to the management server 400. In this case, the user 210 can check the charge fee in advance since the fee required for map generation is displayed on a display unit, which is not illustrated, of the information processing device 100 in real time.

<Supplement for Usage Amount Generation>

In step S102 described in the description of FIG. 4, a process is supplemented in which the usage amount calculation unit 12 calculates as the usage amount, 1. Distance information, 2. Time information, and 3. Data amount information.

<1. When Calculating Distance Information as Usage Amount: Part 1 >

The measurement information includes traveling distance data.

The traveling distance data is data such as an integrated value by odometry, or an integrated value by a ground speed radar/rider sensor, or an integrated distance by satellite positioning. The usage amount calculation unit 12 approximates a link length of a vehicle lane link between a start point and an end point using the traveling distance data of the measurement vehicle 310 based on the position information (after post-processing) at a time of acquisition of the measurement information, processing history of automatic plotting, acquisition history of the point cloud data, and the road width information. The processing history of the automatic plotting is, for example, information indicating whether or not there is a process of automatic plotting. The acquisition history of the point cloud data is, for example, information indicating a laser measurement start point and a laser measurement end point.

The usage amount calculation unit 12 can generate the usage amount based on this link length.

When the GPS receiver that the measurement device 300 has is turned on, the control device that the measurement device 300 has, gives a travel ID to the measurement information. The control device gives the ID for each measurement by the measurement vehicle 310.

From a start of the measurement by the laser scanner to an end of the measurement, the control device gives a scene ID to the measurement information acquired by the laser scanner. With the laser ON button, the camera and the odometry are corporate with each other and turned ON. Corresponding to the scene ID, the control device gives a vehicle lane link ID and a feature ID of the section line and the shoulder line.

The usage amount calculation unit 12 calculates the traveling distance between the laser measurement start point and the laser measurement end point for the same scene ID. When the position information at a time of data acquisition exists within a same road width, the usage amount calculation unit 12 determines that the data is overlapped and removes the overlapped data. When the automatic plotting by the map information generation unit 11 is stopped (stopped when there is no point cloud data or no data file), the usage amount calculation unit 12 considers the stop time as the end point. When the plotting is stopped, an alarm is displayed on a screen, which is not illustrated, of the information processing device 100, and editing or remeasurement by CAD is prompted.

The usage amount calculation unit 12 can also calculate the usage amount corresponding to odometry-less by linearly interpolating using GPS data (latitude, longitude) and calculating a road link length.

The laser scanner is constantly rotating. The control device divides the same traveling ID into a plurality of scenes (scene IDs) and performs the measurement. This is to prevent a storage error of the measurement information. Since the data is fragmented with different scene IDs, the control device performs data joining. The measurement vehicle 310 measures and travels a first or third vehicle lane if it has three vehicle lanes, and measures and travels a second or fourth vehicle lane if it has four vehicle lanes.

<1. When Calculating Distance Information as Usage Amount: Part 2>

Based on the acquisition history (laser measurement start point and end point) of the line map and the point cloud data acquired by the automatic plotting using the measurement information, the usage amount calculation unit 12 approximates the vehicle lane link length of the vehicle lane link between the start point and the end point of the section in which the map information has been generated and generates the usage amount based on the vehicle lane link length. The usage amount calculation unit 12 determines that the vehicle lane link length acquired from the same vehicle lane link is overlapped data, and performs the exclusion correction (step S103) to exclude the overlapped data. The start point and the end point may be set as the times when the laser operation button and the stop button are pressed.

<2. When Calculating Time Information as Usage Amount>

The usage amount calculation unit 12 can generate the usage amount based on the start time and the end time at which the acquisition history of the 3-D point cloud data included in the measurement information is acquired.

<3. When Calculating Data Amount Information as Usage Amount>

The usage amount can be generated based on the data amount of the 3-D point cloud data (after post-processing) included in the measurement information. The usage amount calculation unit 12 does not delete overlapped data (the process in step S103).

Second Embodiment

The fee calculation system 1000 of the second embodiment will be described with reference to FIGS. 5 to 8.

Figure 5:
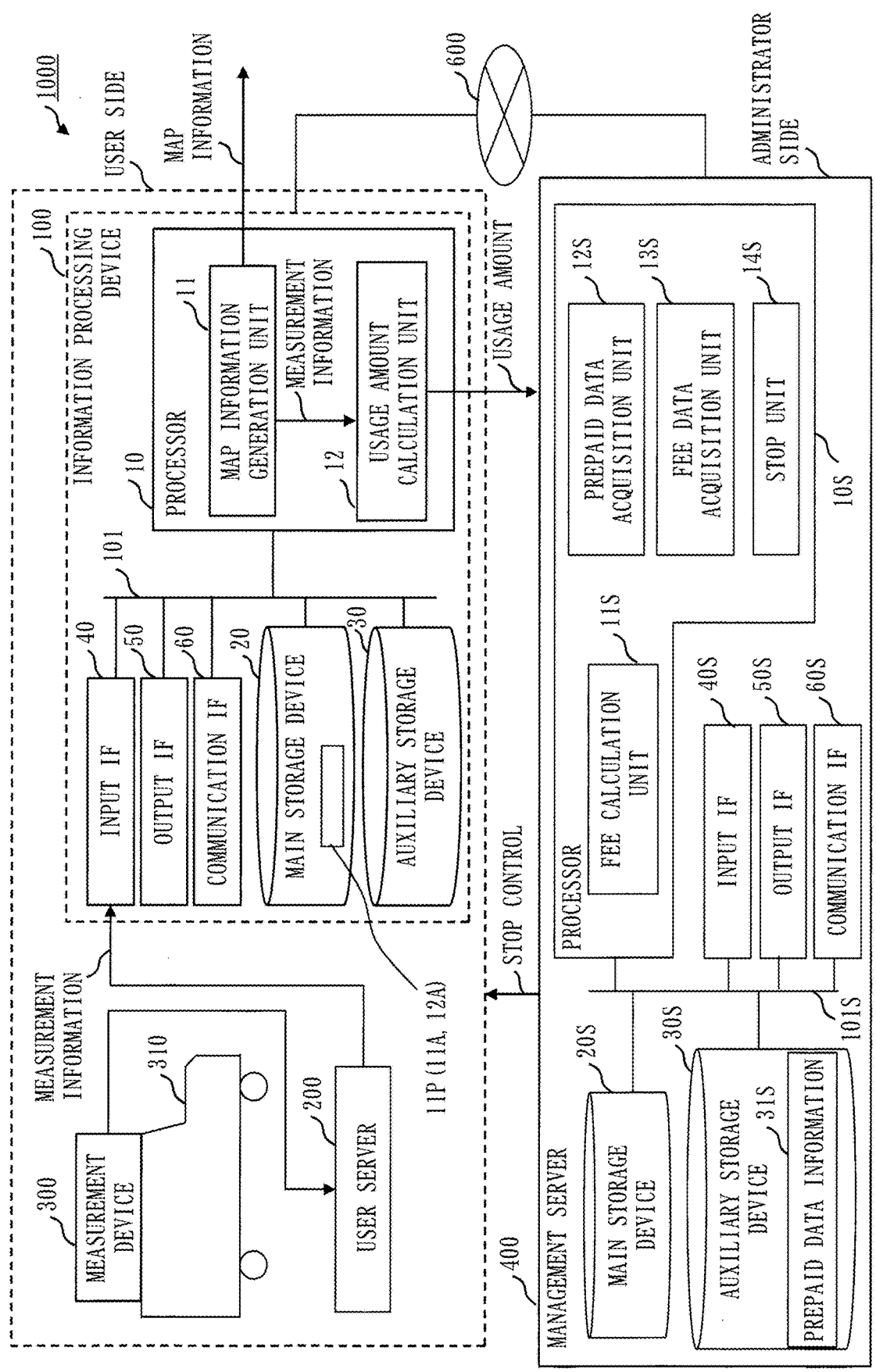
FIG. 5 is a diagram illustrating a hardware configuration of a fee calculation system 1000, which is a diagram of a second embodiment.

FIG. 5 illustrates a hardware configuration of the fee calculation system 1000 of the second embodiment.

Figure 6:
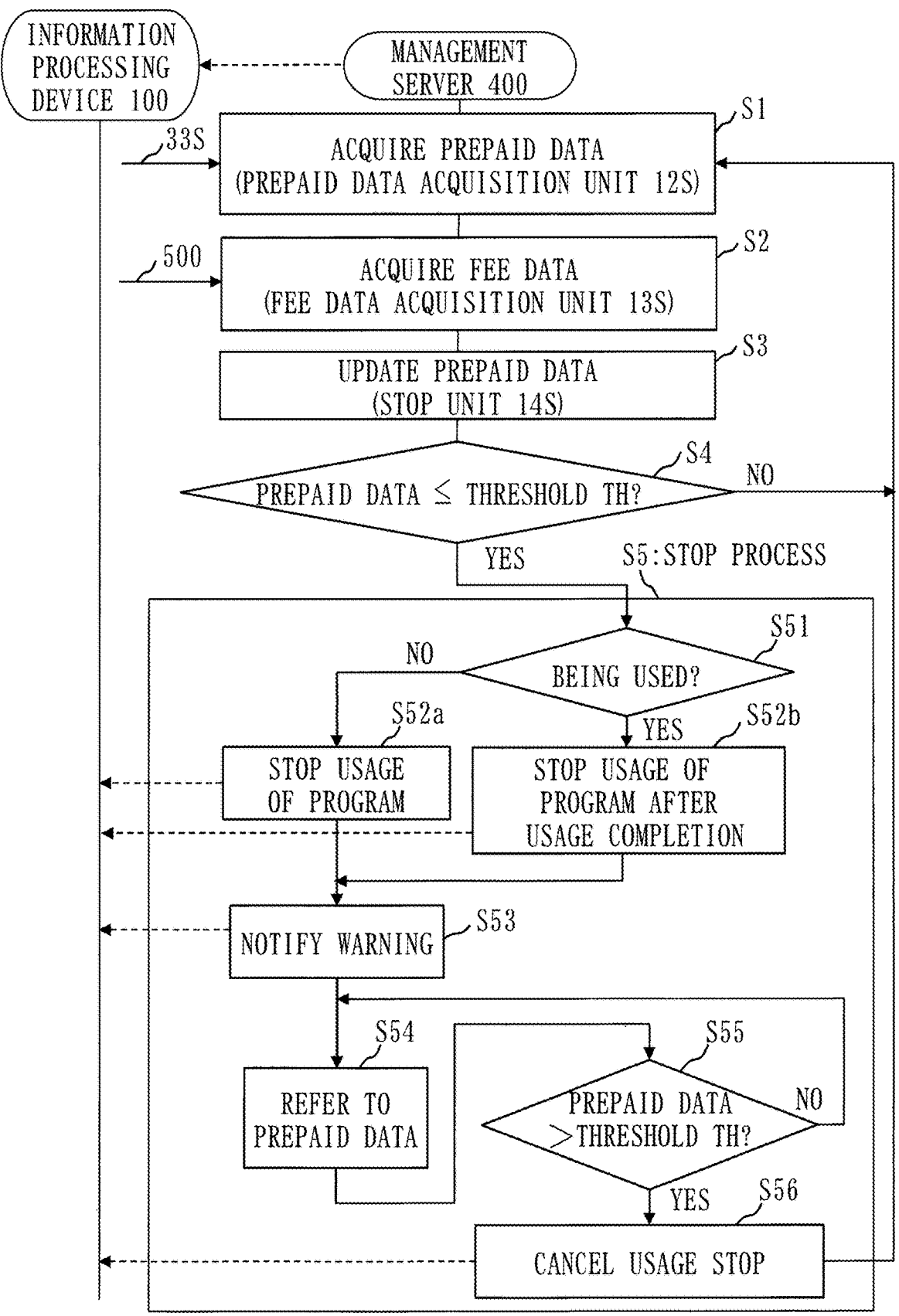
FIG. 6 is a flowchart illustrating an operation of a management server 400, which is a diagram of the second embodiment.

FIG. 6 is a flowchart illustrating operation of the management server 400 of the second embodiment. The management server 400 of the second embodiment is a program stop device.

In an approach of the first embodiment, the usage amount of the map information generation unit 11 is calculated after the plotting process is completed. That is, in the first embodiment, in step S20 illustrated in FIG. 2, the map information generation unit 11 of the information processing device 100 generates the map information, and in step S30, the usage amount calculation unit 12 calculates the usage amount of the map information generation unit 11. The usage amount calculated by the usage amount calculation unit 12 is the usage amount of the map information generation unit 11 which is the map information generation program 11A.

In the second embodiment, the user who uses the map information generation program 11A registers the prepayment money in the management server 400 as a prepaid method. The management server 400 stops using a next map information generation program 11A when there is a usage amount of the map information generation program 11A exceeding the prepayment money. The second embodiment will be specifically described below.

* Description of Configuration *

Configurations of the information processing device 100 and the management server 400 of the second embodiment will be described with reference to FIG. 5. The information processing device 100 illustrated in FIG. 5 has a same configuration as the information processing device 100 of the first embodiment illustrated in FIG. 3.

The management server 400 illustrated in FIG. 5 further includes a prepayment data acquisition unit 12S, a fee data acquisition unit 13S, and a stop unit 14S with respect to the management server 400 of the first embodiment illustrated in FIG. 3. A usage stop program that realizes functions of the prepayment data acquisition unit 12S, the fee data acquisition unit 13S, and the stop unit 14S is stored in the auxiliary storage device 30S. The usage stop program realizes an operation of the management server 400 which is the program stop device. The usage stop program is a program which causes a computer execute each process, each procedure, or each step obtained by reading "unit" of each unit of the prepayment data acquisition unit 12S, the fee data acquisition unit 13S, and the stop unit 14S as "process", "procedure", or "step".

In the management server 400 of the second embodiment, the auxiliary storage device 30S stores prepayment data information 31S. The prepayment data information 31S will be described in the description of the operation. The information processing device 100 and the management server 400 are connected via a network 600. The information processing device 100 communicates with the management server 400 via the network 600 using the communication interface 60. The management server 400 communicates with the information processing device 100 using the communication interface 60S.

* Description of Operation *

FIG. 6 is a flowchart illustrating the operation of the fee calculation system 1000 of the second embodiment. The operation of the fee calculation system 1000 of the second embodiment will be described with reference to FIG. 6.

<Step S1>

In step S1, the prepayment data acquisition unit 12S acquires the prepayment data of the user. The prepayment data indicates the prepayment money paid by the user 210 who uses the map information generation program 11A.

FIG. 7 illustrates the prepayment data information 31S managed by the management server 400. The prepayment data information 31S is a record configured by a user ID 32S that identifies the user 210 and by prepayment data 33S associated with the user ID 32S. The prepayment data 33S may be an amount of money, or may be points that can be converted into an amount of money. The user 210 prepays the usage fee of the map information generation program 11A. In the prepayment data information 31S, the prepayment data 33S is recorded as a user setting value for each user ID 32S. In step S1, the prepayment data acquisition unit 12S acquires the user ID 32S, and the prepayment data 33S corresponding to the acquired user ID 32S is acquired from the prepayment data information 31S.

In the second embodiment, the prepayment data acquisition unit 12S acquires the user ID 32S=001. Along with this, a case in which the prepayment data acquisition unit 12S acquires the prepayment data 33S=300,000 corresponding to the user ID 32S=001 from the prepayment data information 31S, will be described as an example.

<Step S2>

In step S2, the fee data acquisition unit 13S acquires fee data 500. The fee data 500 is data indicating a usage fee acquired from the usage amount of the map information generation program 11A when the user 210 with the user ID=001 uses the map information generation program 11A during a first period. The fee data 500 is a same unit as the prepayment data 33S.

Here, the first period will be described. The first period is a predefined period and is a current charging period of the usage fee of the map information generation program 11A.

Figure 8:
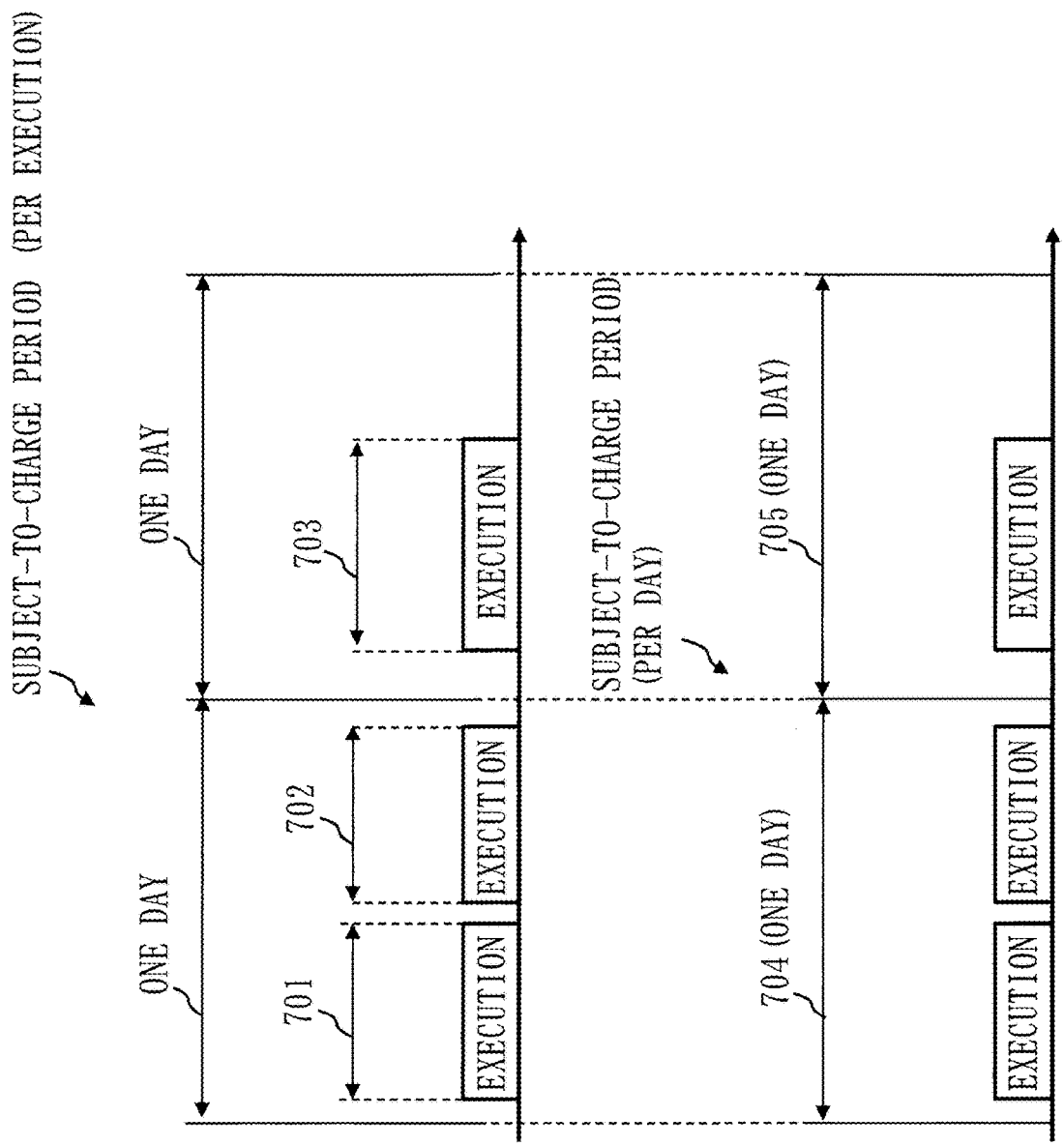
FIG. 8 is a diagram illustrating a charging period of a usage fee for usage of a map information generation program 11A, which is a diagram of the second embodiment.

FIG. 8 illustrates a charging period of the usage fee by the usage of the map information generation program 11A. An upper side of FIG. 8 is an example in which one execution of the map information generation program 11A is a charging period. The upper part of FIG. 8 illustrates a charging period 701, a charging period 702, and a charging period 703. A lower part of FIG. 8 is an example in which one day is a charging period. The lower part of FIG. 8 illustrates a charging period 704 and a charging period 705. On the upper side of FIG. 8, if a current charging period is the charging period 701, the charging period 701 is the first period. The charging period 702 is a second period. Besides, the second period does not have to be the charging period immediately after the first period. For example, when the charging period 701 is the first period, the charging period 703 may be the second period, or a charging period after the charging period 703 may be the second period. Further, if a current charging period is the charging period 702, the charging period 702 is the first period and the charging period 703 is the second period. In this case as well, the charging period after the charging period 703 may be the second period. In the lower part of FIG. 8, if the current charging period is the charging period 704, the charging period 704 is the first period and the charging period 705 is the second period.

As described in the first embodiment, the calculation of the fee data 500 may be automatically calculated by the fee calculation unit 11S of the management server 400 based on the usage amount of the map information generation program 11A. Alternatively, the calculation of the fee data 500 may be calculated by an administrator based on the usage amount of the map information generation program 11A, and the calculated fee data 500 may be input into the fee data acquisition unit 13S. An order of step S1 and step S2 may be reversed. Besides, if the usage amount of the map information generation unit 11 is zero, the usage fee of the map information generation unit 11 is also zero.

<Step S3>

In step S3, the stop unit 14S updates the prepayment data 33S by subtracting the fee data 500 from the prepayment data 33S.

In this example, the fee data 500 is 200,000. As illustrated in FIG. 7, when the user ID=001, the prepayment data 33S is 300,000.

Therefore, the stop unit 14S calculates the prepayment data 33S-fee data 500 to acquire 100,000, and decides the updated prepayment data 33S to be 100,000.

<Step S4>

In step S4, the stop unit 14S determines whether or not the updated prepayment data 33S is equal to or less than a threshold value TH.

In this example, the threshold TH is 150,000.

In a case of the updated prepayment data 33S threshold TH (Equation 1), the stop unit 14S stops the usage of the map information generation program 11A in the second period after the first period.

In this example, the first period is the charging period 701 in FIG. 8, and the second period is the charging period 702.

Since the updated prepayment data 33S is 100,000, an above equation 1 is possible. Therefore, in this example, the process proceeds to the stop process of step S5. If the equation 1 is not possible, the process returns to step S1, and the prepayment data acquisition unit 12S is in a state of waiting for acquisition of the prepayment data 33S. Specifically, the process of step S5 is as follows.

<Step S5>

Step S5 is constituted of steps S51, S52*a*, S52*b*, S53, S54, S55 and S56.

<Step S51>

In step S51, the stop unit 14S determines whether or not the map information generation program 11A is in use during the charging period 702 which is the second period. The management server 400 is connected to the information processing device 100 via the network 600, and the stop unit 14S monitors whether or not the map information generation program 11A is in use. The stop unit 14S can determine whether or not the map information generation program 11A is in use by monitoring.

<Step S52*a*>

If the map information generation program 11A is not in use, the process proceeds to step S52*a*. In step S52*a*, the stop unit 14S stops using the map information generation program 11A. Since the stop unit 14S is connected to the information processing device 100 via the network 600, the usage of the map information generation program 11A during the charging period 702 can be stopped. The process proceeds from step S52a to step S53.

<Step S52b>

If the map information generation program 11A is in use, the process proceeds to step S52b. In step S52b, if the map information generation program 11A is in use during the charging period 702 which is the second period, the stop unit 14S waits for the end of the usage of the map information generation program 11A, and stops the usage of the map information generation program 11A. The process proceeds from step S52b to step S53.

<Step S53>

In step S53, the stop unit 14S generates a warning when the updated prepayment data 33S is equal to or less than the threshold TH. In this example, since the updated prepayment data 33S is 100,000 and the threshold TH is 150,000, the updated prepayment data 33S is less than or equal to the threshold TH. Therefore, the stop unit 14S generates the warning. The stop unit 14S transmits the generated warning to the information processing device 100 via the network 600.

<Step S54>

When the stop unit 14S stops the usage of the map information generation program 11A, the stop unit 14S refers to the prepayment data 33S of the storage device in which the prepayment data 33S is registered. When the stop unit 14S stops the usage of the map information generation program 11A, the stop unit 14S refers to the prepayment data 33S of the record of the user ID=001 stored in the auxiliary storage device 30S.

<Step S55>

In step S55, the stop unit 14S compares the referred prepayment data 33S with the threshold TH. When the stop unit 14S determines that the prepayment data 33S exceeds the threshold value TH, the process proceeds to step S56. When the stop unit 14S determines that the prepayment data 33S is equal to or less than the threshold value TH, the process returns to step S54.

<Step S56>

In step S56, the stop unit 14S cancels the stop of the usage of the map information generation program 11A when the referred prepayment data 33S exceeds the threshold value TH. Specifically, it is as follows.

For example, when the prepayment data 33S corresponding to the user ID=001 is 600,000 after lapse of the charging period 702, the stop unit 14S determines that the prepayment data 33S exceeds the threshold value TH, and cancels the stop of the usage of the map information generation program 11A. The stop unit 14S cancels the stop of the usage of the map information generation program 11A via the network 600.

* Effect of Second Embodiment *

In the fee calculation system 1000 of the second embodiment, since the prepayment money can be paid, convenience of the payment of the usage fee for the user is improved.

Further, when the map information generation program 11A to be stopped is in use, the management server 400 stops the usage of the map information generation program 11A after the end of the usage of the map information generation program 11A. Therefore, the convenience for the user is improved.

Third Embodiment

The third embodiment supplements a hardware configuration of the information processing device 100 of the first embodiment. The function of the information processing device 100 described in the first embodiment is realized by a program. However, a function of the information processing device 100 may be realized by hardware.

Figure 9:
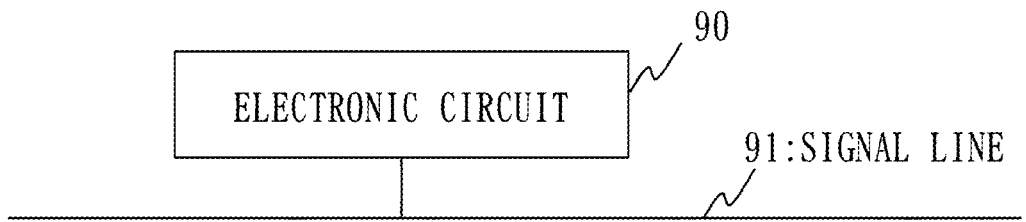
FIG. 9 is a diagram which supplements hardware configurations of an information processing device 100 and a management server 400, which is a diagram of a third embodiment.

FIG. 9 illustrates a configuration in which the functions of the information processing device 100 are realized by hardware. The electronic circuit 90 of FIG. 9 is a dedicated electronic circuit that realizes functions of the map information generation unit 11 and the usage amount calculation unit 12 of the information processing device 100. The electronic circuit 90 is connected to the signal line 91. The electronic circuit 90 is specifically a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array. The functions of the components of the functions of the information processing device 100 may be realized by one electronic circuit, or may be realized by being distributed to a plurality of electronic circuits. Further, some functions of the components of the functions of the information processing device 100 may be realized by the electronic circuit 90, and remaining functions may be realized by software.

Further, the functions of the fee calculation unit 11S, the prepayment data acquisition unit 12S, the fee data acquisition unit 13S, and the stop unit 14S of the management server 400 may be realized by the electronic circuit 90 of FIG. 9. Further, the functions of the components of the management server 400 may be realized by one electronic circuit, or may be realized by being distributed to a plurality of electronic circuits. Further, some functions of the components of the functions of the management server 400 may be realized by the electronic circuit 90, and the remaining functions may be realized by software.

Each of the CPU and the electronic circuit 90 is also referred to as processing circuitry. Functions of the map information generation unit 11 and the usage amount calculation unit 12 of the information processing device 100 may be realized by the processing circuitry. Further, functions of the fee calculation unit 11S, the prepayment data acquisition unit 12S, the fee data acquisition unit 13S, and the stop unit 14S of the management server 400 may be realized by the processing circuitry.

Further, the map information generation unit 11, the usage amount calculation unit 12, and the fee calculation unit 11S may be configured as a system. In this system, the functions of the map information generation unit 11, the usage amount calculation unit 12, and the fee calculation unit 11S may be realized by the processing circuitry.

REFERENCE SIGNS LIST

TH: threshold, 10: processor, 11: map information generation unit, 11A: map information generation program, 11P: information processing program, 12: usage amount calculation unit, 12A: usage amount calculation program, 20: main storage device, 30: auxiliary storage device, 40: input interface, 50: output interface, 60: communication interface, 10S: processor, 11S: fee calculation unit, 12S: prepayment data acquisition unit, 13S: fee data acquisition unit, 14S: stop unit, 20S: main storage device, 30S: auxiliary storage device, 31S: prepayment data information, 32S: user ID, 33S: prepayment data, 40S: input interface, 50S: output interface, 60S: communication interface, 100: information processing device, 200: user server, 210: user, 300: measurement device, 310: measurement vehicle, 400: management server, 500: fee data, 600: network, 701, 702, 703, 704, 705: charging period, 1000: fee calculation system.

The invention claimed is:

1. A Mobile Mapping System (MMS)-related information processing device comprising:
    processing circuitry
        to electronically receive measurement information measured by a measurement device to execute a map information generation program, the measurement device including at least a camera,
        to execute the map information generation program to generate newly created map information plotted by extracting features from measurement information that includes a plurality of types of information measured by the measurement device which measures information on the features and is mounted on a vehicle,
        to calculate a usage amount of the map information generation program used for generating the newly created map information by using at least one of the plurality of types of information measured by the measurement device, and
        to output the usage amount of use for the map information generation program to generate the new map information,
    wherein the processing circuitry calculates the usage amount of the map information generation program using information of the measurement information actually used for generating the map information and not using information of the measurement information measured by the measurement device but not used to generate the map information, and
    wherein the usage amount includes the usage amount of the map information generation program and usage amount of the measurement device to measure the information on the features.

2. The Mobile Mapping System (MMS)-related information processing device according to claim 1, wherein the processing circuitry calculates distance information indicating a distance of a section in which the newly created map information has been generated, as the usage amount by using at least one type of information among the plurality of types of information included in the measurement information used for generating the newly created map information.

3. The Mobile Mapping System (MMS)-related information processing device according to claim 1, wherein the processing circuitry calculates measurement time information indicating measurement time taken for measurement of the section in which the newly created map information has been generated, as the usage amount by using at least one type of information among the plurality of types of information included in the measurement information used for generating the newly created map information.

4. The Mobile Mapping System (MMS)-related information processing device according to claim 1, wherein the processing circuitry calculates data amount information indicating data amount of the section in which the newly created map information has been generated, as the usage amount by using at least one type of information among the plurality of types of information included in the measurement information Bused for generating the newly created map information.

5. The Mobile Mapping System (MMS)- related information processing device according to claim 1, wherein the processing circuitry calculates a final usage amount by determining whether or not an exclusion item set as an item to be excluded from calculation of the usage amount exists, and excluding the exclusion item from the usage amount when the exclusion item exists.

6. The Mobile Mapping System (MMS)-related information processing device according to claim 5, wherein the determining whether or not the exclusion item exists includes determining whether or not a section in which generation has failed in a part of the newly created map information generated exists, as the exclusion item, and excluding the section in which the generation has failed, from the usage amount when the section in which the generation has failed exists.

7. The Mobile Mapping System (MMS)-related information processing device according to claim 5, wherein the determining whether or not the exclusion item exists includes determining whether or not an area generated being overlapped with the newly created map information generated exists, as the exclusion item, and eliminating overlapping by excluding an overlapped area from the usage amount when the area generated being overlapped exists.

8. The Mobile Mapping System (MMS)-related information processing device according to claim 1, wherein the outputting of the usage amount by the processing circuitry includes transmitting the usage amount to a server external to the information processing device.

9. A Mobile Mapping System (MMS)-related fee calculation system comprising:
    a vehicle-mountable measurement device that includes a camera and a laser scanner; and
    processing circuitry operatively coupled to the measurement device, to
    execute a map information generation program to generate newly created map information plotted by extracting features from measurement information that includes a plurality of types of information measured by the measurement device which measures information on the features and is mounted on a vehicle,
    calculate a usage amount of the map information generation program used for generating the newly created map information by using at least one of the plurality of types of information measured by the measurement device,
    calculate a usage fee of the map information generation program based on the usage amount, and
    transmit the usage amount to second processing circuitry different from said processing circuitry.

10. The Mobile Mapping System (MMS)-related fee calculation system according to claim 9, wherein the processing circuitry calculates distance information indicating measurement distance of the measurement information used for generating the newly created map information, as the usage amount by using at least one type of information among the plurality of types of information included in the measurement information used for generating the newly created map information.

11. The Mobile Mapping System (MMS)-related fee calculation system according to claim 9, wherein the processing circuitry is part of a computer at a user side, the second processing circuitry is part of a server, and the usage amount is transmitted from the processing circuitry to the second processing circuitry via an electronic communications network.

12. A Mobile Mapping System (MMS)-related program stop device comprising:
    processing circuitry to acquire prepayment data indicating prepayment money paid by a user who uses a map information generation program which generates newly created map information plotted by extracting features from measurement information that include a plurality of types of information measured by a measurement device which measures information on the features and is mounted on a vehicle, to acquire fee data indicating a usage fee acquired from a usage amount of the map information generation program when the user has used the map information generation program during a first period, to update the prepayment data by subtracting the fee data from the prepayment data, and to automatically stop usage of the map information generation program by the user during a second period after the first period responsive to the prepayment data updated being equal to or less than a threshold, wherein the processing circuitry refers the prepayment data of a storage device in which the prepayment data is registered, when the usage of the map information generation program is stopped, and cancels a usage stop of the map information generation program when the prepayment data referred exceeds the threshold.

13. The Mobile Mapping System (MMS)-related program stop device according to claim 12, wherein the processing circuitry waits for completion of the usage of the map information generation program when the map information generation program is in use during the second period, and stops the usage of the map information generation program.

14. The Mobile Mapping System (MMS)-related program stop device according to claim 12, wherein the processing circuitry generates a warning when the prepayment data updated is equal to or less than the threshold.

* * * * *